US006781346B2

(12) United States Patent
Reinhard et al.

(10) Patent No.: US 6,781,346 B2
(45) Date of Patent: Aug. 24, 2004

(54) CHARGING UNIT FOR A CONTACTLESS TRANSFER OF ELECTRIC POWER AS WELL AS A POWER ABSORBING DEVICE AND A CHARGING SYSTEM

(75) Inventors: Arno Reinhard, Münster (DE); Ralf gen.Berghegger Schröeder, Glandorf (DE)

(73) Assignee: Friwo Geraetebau GmbH (DE)

( * ) Notice: Subject to any disclaimer, the term of this patent is extended or adjusted under 35 U.S.C. 154(b) by 0 days.

(21) Appl. No.: 10/192,824

(22) Filed: Jul. 10, 2002

(65) Prior Publication Data

US 2003/0030530 A1 Feb. 13, 2003

(30) Foreign Application Priority Data

Jul. 10, 2001  (DE) ..................................... 201 11 386 U

(51) Int. Cl.[7] ................................................. H02J 7/00
(52) U.S. Cl. ...................................................... 320/108
(58) Field of Search ......................................... 320/108

(56) References Cited

U.S. PATENT DOCUMENTS

| | | | |
|---|---|---|---|
| 3,277,358 A | 10/1966 | Nicholl ....................... | 320/111 |
| 3,549,990 A | 12/1970 | Hochheiser ................. | 323/345 |
| 3,609,501 A * | 9/1971 | Ray et al. ................... | 320/108 |
| 3,772,625 A | 11/1973 | Raupach ...................... | 336/94 |
| 4,912,391 A | 3/1990 | Meadows ................... | 320/108 |
| 5,680,028 A * | 10/1997 | McEachern ................. | 320/108 |
| 5,952,814 A * | 9/1999 | Van Lerberghe ............ | 320/108 |
| 6,028,413 A * | 2/2000 | Brockmann ................. | 320/108 |
| 6,118,249 A * | 9/2000 | Brockmann et al. ........ | 320/108 |

FOREIGN PATENT DOCUMENTS

DE             19741279 A1     3/1999

* cited by examiner

Primary Examiner—Pia Tibbits
(74) Attorney, Agent, or Firm—Michael Best & Friedrich LLP

(57) ABSTRACT

A charging system is used for contactless transfer of electric power from a charging unit to a mobile unit. The system includes a first substantially U-shaped ferrite core which is operable to be located within the charging unit. The first core includes a base area and two leg areas. Each leg area of the first core includes a pole face. A first winding is arranged on the base area of the first ferrite core. The system also includes a second substantially U-shaped ferrite core which is operable to be located within a mobile unit. The second core includes a base area and two leg areas. Each leg area of the second core includes a pole face. A second winding is arranged on the base area of the second ferrite core. The first ferrite core has larger cross-sectional dimensions than the second ferrite core.

19 Claims, 2 Drawing Sheets

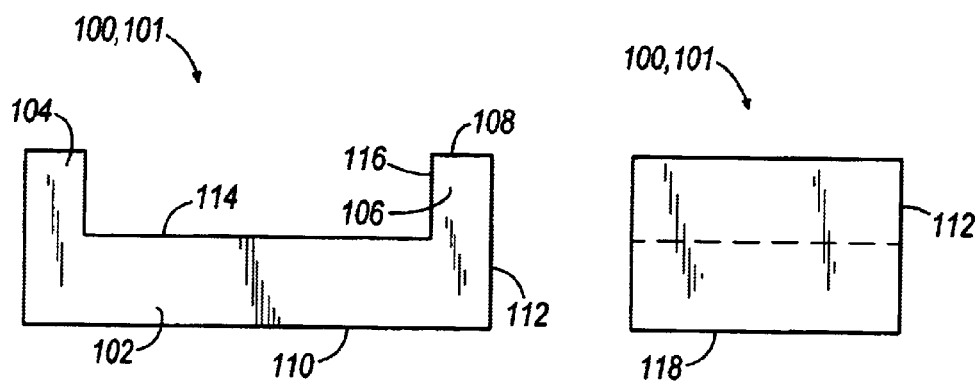
FIG. 1  FIG. 2
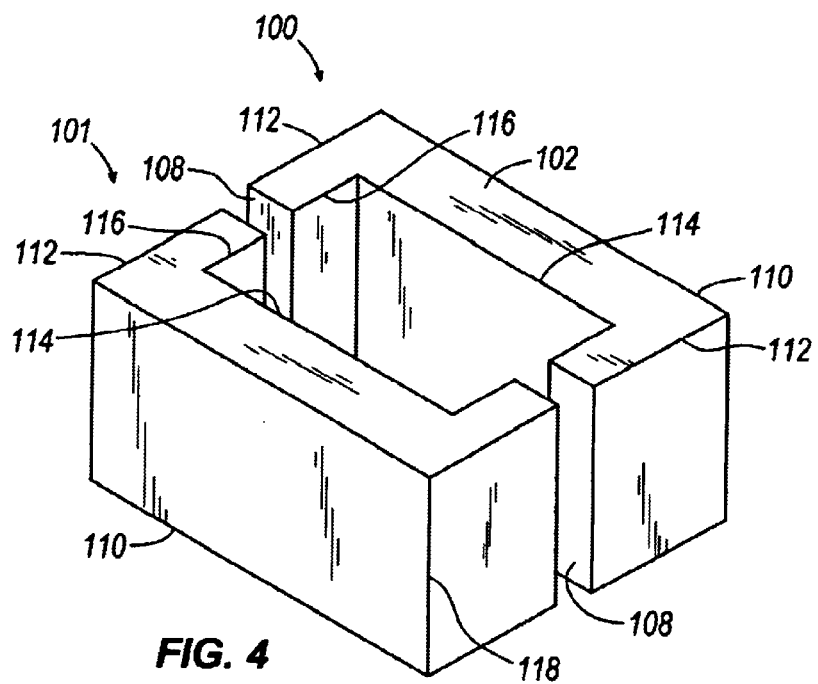
FIG. 4

CHARGING UNIT FOR A CONTACTLESS TRANSFER OF ELECTRIC POWER AS WELL AS A POWER ABSORBING DEVICE AND A CHARGING SYSTEM

FIELD OF THE INVENTION

The present invention relates to a charging unit used for a contactless transfer of electric power to a mobile unit.

BACKGROUND OF THE INVENTION

A contactless transfer of power according to the principle of inductive coupling, often referred to as a power transformer, is used for charging accumulators or rechargeable batteries in a mobile electric unit, such as a mobile radio communication device or a cordless telephone. It is also used in the field of automotive engineering. For such contactless power transfer, power is inductively transferred by means of an alternating magnetic field from a charger to the mobile unit, as known from the German Patent Application DE 197 41 279 A1. A primary winding and a secondary winding are arranged on lateral legs of two U-shaped ferrite cores. Other known shapes are rod-shaped or E-shaped ferrite cores. In the case of conventional charging systems used for contactless power transfer, ferrite cores of a primary side and of a secondary side have identical dimensions.

The known embodiments of the ferrite cores have excessively high intrinsic magnetic coupling that is caused by stray inductances between the pairs of poles of each ferrite core. This causes coupling between the primary side and the secondary side to be insufficient. For example, if there is only a coupling of 50% or, in other words, only half of the power is transferred, very high magnetic field strengths occur in the primary core when the cores have identical dimensions. This leads to high core power losses and to a saturation of the core. Identically sized pole faces are also known to have a reduced magnetic coupling when the two pole faces are displaced relative to one another.

SUMMARY OF THE INVENTION

In one embodiment, a charging unit used for a contactless transfer of electric power to a mobile unit includes a substantially U-shaped ferrite core. The core has a base area and two leg areas. Each leg area includes a pole face. A primary winding is arranged on the base area of the ferrite core.

In another embodiment, a power absorbing device in a mobile unit used for contactless absorption of electric power from a primary winding located in a charging unit includes a substantially U-shaped ferrite core. The core has a base area and two leg areas. Each leg area includes a pole face. A secondary winding is arranged on the base area of the ferrite core.

In a further embodiment, a charging system used for contactless transfer of electric power from a charging unit to a mobile unit includes a first substantially U-shaped ferrite core which is operable to be located within the charging unit. The first core includes a base area and two leg areas. Each leg area of the first core includes a pole face. A first winding is arranged on the base area of the first ferrite core. The system also includes a second substantially U-shaped ferrite core which is operable to be located within a mobile unit. The second core includes a base area and two leg areas. Each leg area of the second core includes a pole face. A second winding is arranged on the base area of the second ferrite core. The first ferrite core has larger cross-sectional dimensions than the second ferrite core.

In yet a further embodiment, a method of transferring electric power from a primary winding to a secondary winding includes arranging the primary winding on a base area of a first U-shaped ferrite core. The base area of the first core is longer than each leg area of the first core. The method also includes arranging the secondary winding on a base area of a second U-shaped ferrite core. The base area of the second core is longer than each leg area of the second core.

In one embodiment, by arranging a secondary and/or primary winding on a base area of a U-shaped ferrite core, stray inductances can be kept as low as possible. An improved coupling leads to a higher overall efficiency. This permits either an increase in the power that is transferred relative to a core volume or the use of smaller transformers for transferring the same power. Such a transformer saves costs and is advantageous as far as the demands for a far-reaching miniaturization of the components are concerned.

According to a further embodiment, a base area of a U-shaped ferrite core of a secondary side and/or of a primary side is longer than leg areas of the ferrite core, so that the ferrite core has a substantially elongate structural design. This structural design of the core leads to an improved magnetic coupling. In one embodiment, the length ratio of the base area to the leg area is approximately between about 2:1 and about 4:1.

In another embodiment, a charging system used for a contactless transfer of electric power to a mobile unit has a primary-side ferrite core and a secondary-side ferrite core. The primary-side core has larger dimensions than the secondary-side ferrite core. This arrangement allows the core power losses to be kept low and a saturation of the core is avoided, even if an economy-priced standard ferrite material is used.

In a further embodiment, pole faces of a primary-side ferrite core have larger dimensions than pole faces of a secondary-side ferrite core. This arrangement avoids a reduction of the magnetic coupling in the case of a geometric displacement between the two pole faces.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein:

FIG. 1 shows a side view of a U-shaped ferrite core embodying the invention.

FIG. 2 shows an additional side view of the U-shaped ferrite core embodying the invention.

FIG. 4 shows a first ferrite core and a second ferrite core embodying the invention.

DETAILED DESCRIPTION OF THE INVENTION

Figure 3:
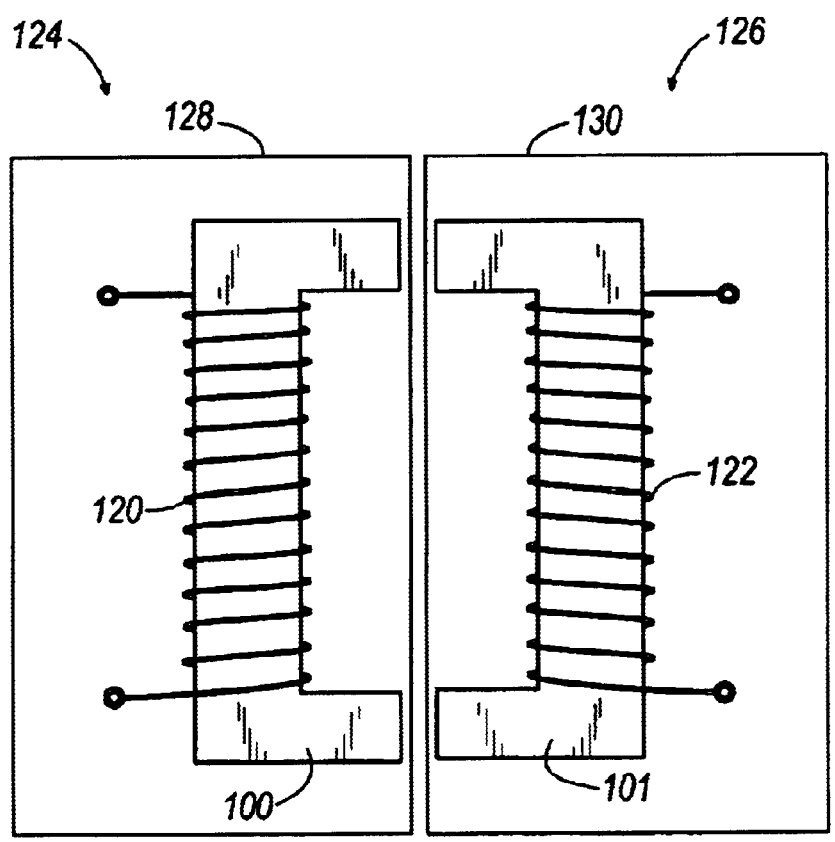
FIG. 3 shows the arrangement of the windings on ferrite cores embodying the invention.

FIGS. 1 and 2 illustrate side views of a ferrite core 100 for use in a transformer embodying the invention. The ferrite core 100 is used on a primary side and a similar ferrite core 101 is used on a secondary side of the transformer for providing a contactless transfer of electric power from one side to the other, in accordance with the present invention. The ferrite core 100, 101 is substantially U-shaped. In other embodiments (not shown), the ferrite core 100, 101 is of a different shape, such as rod-shaped or E-shaped. The ferrite core 100, 101 comprises a base area 102 and two leg areas 104, 106. Each leg area 104, 106 includes a pole face 108. According to the present invention, a winding 120 (shown in FIG. 3) is arranged on the base area 102 of the U-shaped ferrite core 100, 101. In one embodiment of the present invention, the length 110 of the base area 102 is larger than the outer length 112 of the leg areas 104, 106. This arrangement allows magnetic coupling between the two pairs of poles 108 to be at a low value. In the embodiment shown in FIG. 1, the length 110 of the base area 102 is approximately two to three times longer than the outer length 112 of the leg areas 104, 106. The ratio of the inner length 114 of the base area 102 to the inner length 116 (shown in FIG. 2) of the leg areas 104, 106 is approximately equal to about 4:1. As shown in FIG. 2, the depth 118 of the ferrite core 100, 101 is slightly larger than the outer length 112 of the leg areas. In this embodiment, a particularly compact structural design of the secondary side as well as of the primary side of the transformer is achieved. When the ferrite core is used in a mobile phone, for example, the length 110 of the base area is approximately 20 to approximately 30 mm.

In another embodiment as shown in FIG. 4, the primary-side ferrite core 100 has larger cross-sectional dimensions 110, 112, 114, 116, and 118 than the secondary-side ferrite core (shown in FIGS. 3 and 4 as reference number 101). In particular, the pole faces 108 of the primary-side ferrite core 100 are larger than the pole faces (not shown) of the secondary-side ferrite core 101 (shown in FIGS. 3 and 4). Configuring the primary-side ferrite core 100 to have larger cross-sectional dimensions than the secondary-side ferrite core 101 allows for a more efficient magnetic coupling, if the pole faces 108 of the primary and secondary cores 100, 101 are displaced relative to one another. In a further embodiment, a possible area ratio of the primary-side pole faces 108 to the secondary-side pole faces is approximately 1.7:1. In other embodiments (not shown), lower or higher values is used, such as, for example, a ratio of 1.5:1 or a ratio of 2.5:1.

FIG. 3 shows schematically the arrangement of the windings 120, 122 on the base areas 102 of the U-shaped ferrite cores 100, 101. The first ferrite core 100 is located on the primary side 124, and the second ferrite core 101 is located on the secondary side 126. For the sake of simplicity, the different sizes of the primary-side and of the secondary-side ferrite core are not shown in this figure. In one embodiment, the primary side 124 is located within a charging unit 128 and the secondary side 126 is located within a mobile unit 130, such as a mobile phone.

What is claimed is:

1. A charging system used for a contactless transfer of electric power from a charging unit to a mobile unit, said the charging unit transferring by means of an alternating magnetic field electric power from at least one primary winding (120) arranged in said charging unit to at least one secondary winding (122) arranged in said mobile unit, the charging system comprising:
    a first substantially U-shaped ferrite core arranged in said charging unit, the first ferrite core comprising
        a first base having a first base length,
        a first leg having a first leg length,
        a second leg having a second leg length,
        a first pole face positioned at an end of the first leg, and
        a second pole face positioned at an end of the second leg,
    a second substantially U-shaped ferrite core arranged in said mobile unit, the second ferrite core comprising
        a second base having a second base length,
        a third leg having a third leg length,
        a fourth leg having a fourth leg length,
        a third pole face positioned at an end of the third leg, and
        a fourth pole face positioned at an end of the fourth leg, and
    wherein the first base length is greater than the second base length, the first leg length and second leg length are greater than the third leg length and fourth leg length, and the first pole face and the second pole face are larger than the third pole face and the fourth pole face.

2. A system according to claim 1, wherein the ratio of the first and second pole faces to the third and fourth pole faces falls between 1.5:1 and 2.5:1.

3. A system according to one of the claim 1, wherein the secondary winding is arranged on the base of the second ferrite core and the primary winding is arranged on the base of the first ferrite core.

4. A charging system used for a contactless transfer of electric power from a charging unit to a mobile unit, the charging system comprising:
    a first substantially U-shaped ferrite core operable to be located within the charging unit, the first ferrite core including a base, two legs, a pole face located on each leg, and a first winding;
    a second substantially U-shaped ferrite core operable to be located within the mobile unit, the second ferrite core including a base, two legs, a pole face located on each leg, and a second winding; and
    wherein the first ferrite core has larger cross-sectional dimensions than the second ferrite core.

5. A system according to claim 4, wherein the pole faces of the first ferrite core are larger than the pole faces of the second ferrite core.

6. A system according to claim 5, wherein a ratio of the pole faces of the first ferrite core to the pole faces of the second ferrite core is between about 1.5:1 and about 2.5:1.

7. A system according to claim 4, wherein the base of the first ferrite core and the base of the second ferrite core are both longer than the leg of the first ferrite core and the leg of the second ferrite core.

8. A system according to claim 4, wherein the first winding and the second winding are located on the base of the first ferrite core and the base of the second ferrite core, respectively.

9. A system according to claim 5, wherein the base of the first ferrite core and the base of the second ferrite core are longer than the legs of the first ferrite core and the legs of the second ferrite core, respectively.

10. A system according to claim 5, wherein the first winding and the second winding are located on the base of the first ferrite core and the base of the second ferrite core, respectively.

11. A system according to claim 6, wherein the base of the first ferrite core and the base of the second ferrite core are longer than the leg of the first ferrite core and the leg of the second ferrite core.

12. A system according to claim 6, wherein the first winding and the second winding are located on the base of the first ferrite core and the base of the second ferrite core, respectively.

13. A system according to claim 7, wherein the first winding and the second winding are located on the base of the first ferrite core and the base of the second ferrite core, respectively.

14. A method of transferring electric power from a primary winding to a secondary winding, the method comprising:

arranging the primary winding on a base of a first U-shaped ferrite core having a first leg and a second leg, wherein the base of the first ferrite core is longer than both the first leg and the second leg of the first ferrite core; and arranging the second winding on a base of a second U-shaped ferrite core having a third leg and a fourth leg, wherein the base of the second ferrite core is longer than both the third leg and the fourth leg of the second ferrite core, and wherein the base of the first core is larger than the base of the second core.

15. The method as claimed in claim 14, further comprising configuring the first U-shaped ferrite core to have a larger dimensions than the second ferrite core.

16. The method as claimed in claim 14, further comprising configuring a first pole face located at an end of the first leg of the first ferrite core, a second pole face located at an end of the second leg of the first ferrite core, a third pole face located at an end of the third leg of the second ferrite core and a fourth pole face located at an end of the fourth leg of the second ferrite core, and wherein the first pole face and the second pole face are each larger than the third pole face and the fourth pole face.

17. The system as set forth in claim 1, and wherein the first base length is greater than the first leg length and the second leg length, and the second base length is greater than the third leg length and the fourth leg length.

18. A charging system used for a contactless transfer of electric power from a charging unit to a mobile unit, the charging system comprising:

a first substantially U-shaped ferrite core arranged in said charging unit, the first ferrite core comprising
  a first base having a first base length,
  a first winding arranged on the first base,
  a first leg having a first leg length,
  a second leg having a second leg length,
  a first pole face positioned at an end of the first leg, and
  a second pole face positioned at an end of the second leg, a second substantially U-shaped ferrite core arranged in said mobile unit, the second ferrite core comprising
  a second base having a second base length,
  a second winding arranged on the second base,
  a third leg having a third leg length,
  a fourth leg having a fourth leg length,
  a third pole face positioned at an end of the third leg, and
  a fourth pole face positioned at an end of the fourth leg, and wherein the first base length is greater than the second base length, the first leg length and second leg length are greater than the third leg length and fourth leg length, and the first pole face and the second pole face are larger than the third pole face and the fourth pole face; and wherein the first base length is greater than the first leg length and the second leg length, and the second base length is greater than the third leg length and the fourth leg length.

19. A charging system used for a contactless transfer of electric power from a charging unit to a mobile unit, the charging system comprising:

a first substantially U-shaped ferrite core arranged in the charging unit, the first ferrite core comprising
  a first base,
  a first winding arranged on the first base,
  a first leg, and
  a first pole face positioned at an end of the first leg, a second substantially U-shaped ferrite core arranged in the mobile unit, the second ferrite core comprising
  a second base,
  a second winding arranged on the second base,
  a second leg, and
  a second pole face positioned at an end of the second leg, and wherein the second pole face does not completely overlap the first pole face when the charging system transfers electric power between the charging unit and the mobile unit.

* * * * *